No Printed Specification Available
5964X
S. Lane,
Horse Power.
Patented May 17, 1830.
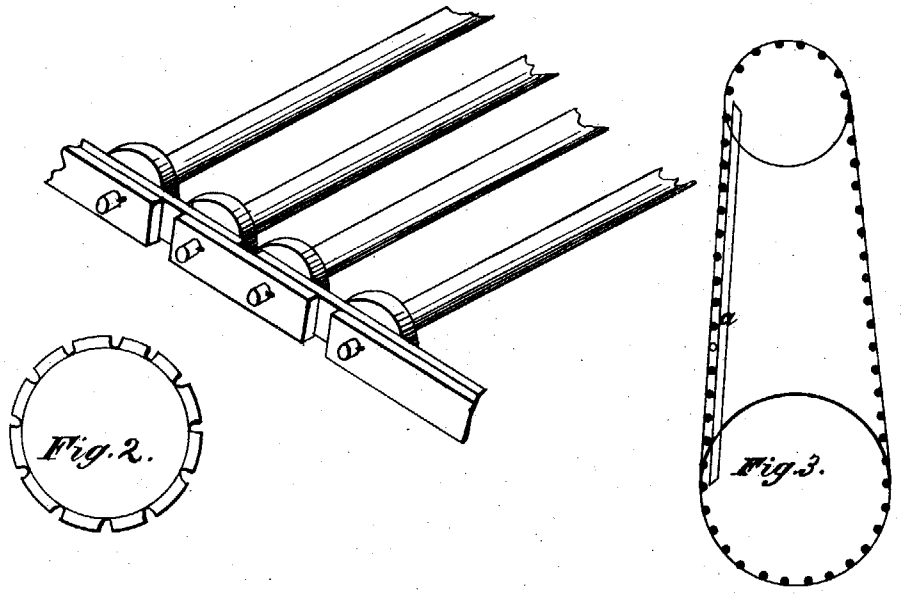
A.M. PHOTO-LITHO. CO. N.Y. (OSBORNE'S PROCESS)

Samuel Lane
Letters Patent X5964

The schedule referred to in these Letters Patent and making part
of the same containing a description in the words of the said Samuel
Lane himself of his improvement in the mode of using Horse
Power called the Endless chain & Rail-way.
To all persons to whom these presents shall come. Samuel
Lane of Hallowell in the County of Kennebec & State of Maine
Gentleman sends Greeting. Be it known that I the said Sam-
uel Lane have invented constructed & applied to use a new
mode of using Horse power by means of an endless chain & rail
way called the Endless chain & Rail way Horse Power. Illustra
ted by the accompanying plates & specified in the words following
to wit. I take round rods of iron of any convenient size & length,
those which I find best are 7/8 of an inch in diameter & twenty inches in
length. A space of an inch and three quarters on each end is turned
down to 5/8 of an inch making a smooth axle or gudgeon. I put
cast iron rollers one inch & three quarters diameter & 3/4 of an inch
thick & turned round & smooth. Each roller takes up 3/4 of an
inch of the gudgeon: on the part projecting thro' the roller. I put
a clasp of iron 3/8 of an inch thick, (two rods to a clasp). on the out
side of these clasps. I put another set in such a manner that they
break joints. see fig 1 & fasten them on by means of a pin thro' the
gudgeon. This connects the rods together & forms a chain, by con
necting the two extremities the chain becomes endless. Two drums
or wheels are then prepared of any diameter desired & fluted so as to receive the
rods see fig 2. these are hung to a frame & the endless chain put on
them. It is best to have one of these drums a little smaller than the
other so as to make a slight ascent. Between the drums & on each
side is an iron plate resting on a wooden joist or beam which forms
a rail way upon which the axle friction rollers move when in opera
tion see fig 3. [illegible] is the railway. The size of the rods rollers &c may
[illegible]

X5964 be varied to suit the wishes of those who use them. I have generally found
the size above described convenient for all purposes to which I have
put them. I place the rods 7/8 of an inch apart this leaves suffi
cient space for the corks of the horses shoe toes between them and
prevent his slipping. For the size of the wheel 18 inches diameter has
been found very convenient for quick motion. I do not claim the
endless chain, or the rotary horse power (as it is sometimes called)
as my invention. But I claim the invention of making this
chain of round rods of iron. & I claim the mode of using the anti=
friction rollers in the manner described, viz. by attaching them
to the ends of the rods & placing a railway beneath them. I
also claim the mode of connecting the rods together by clasps as above
described. In testimony that the above is a true specification
of my said improvement as above described. I have hereto set
my hand and seal this 16th day of April in the year of our
Lord 1830.

Witnesses
Ezekiel Holmes.
Jno. Otis.

Samuel Lane